United States Patent
Heiner et al.

[11] Patent Number: 5,890,738
[45] Date of Patent: Apr. 6, 1999

[54] ROLLOVER BAR WITH DEFORMABLE BEARING

[75] Inventors: Lothar Heiner, Munich; Jens Loemker, Luebbecke, both of Germany

[73] Assignee: Bayerische Motoren Werke Aktiengesellschaft, Munich, Germany

[21] Appl. No.: 797,791

[22] Filed: Feb. 7, 1997

[30] Foreign Application Priority Data

Feb. 7, 1996 [DE] Germany ............ 196 04 423.5

[51] Int. Cl.⁶ .................................................. B60R 21/13
[52] U.S. Cl. .......................... 280/756; 296/102; 267/292
[58] Field of Search ................................. 280/756, 748, 280/751, 762; 296/102; 267/292, 293, 141.2

[56] References Cited

U.S. PATENT DOCUMENTS

| 3,203,728 | 8/1965 | Wood | 296/102 |
| 3,353,852 | 11/1967 | Wood | 296/102 |
| 3,612,581 | 10/1971 | Frankenberg et al. | 296/102 |
| 3,704,031 | 11/1972 | Confer | 280/756 |
| 3,754,315 | 8/1973 | Heitman | 280/756 |
| 4,032,187 | 6/1977 | Atherton | 280/756 |

FOREIGN PATENT DOCUMENTS

| 0 189 819 | 8/1986 | European Pat. Off. . |
| 0 657 327 A1 | 6/1995 | European Pat. Off. . |
| 43 14 538 A1 | 11/1994 | Germany . |
| WO 95/03952 | 2/1995 | WIPO . |

*Primary Examiner*—Peter C. English
*Attorney, Agent, or Firm*—Evenson, McKeown, Edwards & Lenahan, P.L.L.C.

[57] ABSTRACT

A rollover protection device for a motor vehicle has at least one rollover bar which is disposed on a vehicle-fixed structure with a deformable bearing permitting limited movement of the rollover bar relative to the vehicle-fixed structure. In particular, the bearing is elastically deformable and may have at least one deformable, particularly elastically deformable, absorber element which disposes legs of the rollover bar in receiving tubes.

19 Claims, 6 Drawing Sheets

ROLLOVER BAR WITH DEFORMABLE BEARING

BACKGROUND AND SUMMARY OF THE INVENTION

This invention relates to a rollover protection device for a motor vehicle.

In the case of convertibles, it is known to provide a rollover protection device in the form of a rollover bar which, in the case of an accident and particularly in the case of an overturning of the vehicle, forms a firm structure which protects the occupants. Rollover bars of this type are usually mounted rigidly to the vehicle body or have a folding mechanism which folds them upwards, from a lowered inoperative position, as required, into an active safety position in which the bar can then be held in a rigidly locked manner.

Although, for reasons of stability, a rigid arrangement of the rollover bar is desirable, it can have disadvantageous effects if, during an accident, a vehicle occupant hits his head on the rollover bar and is injured by it.

It is therefore an object of the present invention to improve a rollover protection device of the initially mentioned type such that its injury potential is reduced, particularly with respect to a head impact.

SUMMARY OF THE INVENTION

This and other objects have been achieved according to the present invention by providing a rollover protection device for a motor vehicle, comprising at least one rollover bar which is disposed on a vehicle-fixed structure with a deformable bearing which permits a limited relative movement of the rollover bar with respect to the vehicle-fixed structure.

By means of the deformable bearing of the rollover bar on a vehicle-fixed structure, when force is introduced, the rollover bar can move by a limited path relative to the fixed body structure before it rests against the fixed body structure in a rigid and firm manner. In this case, for example, in the case of the impact of a vehicle occupant's head, the HIC (head-injury-criterion) values can be significantly lowered in contrast to a non-resilient arrangement. The bearing absorbs the energy introduced into the rollover bar and therefore has a damping effect. Such a deformation can take place plastically; thus, for example, an aluminum honeycomb construction can be used as the deformable component for the bearing. Alternatively, the deformable component for the bearing may be made of an elastic material such as rubber, foam rubber, or an elastic polymer, which may be vulcanized for added strength. As the result of the deformable bearing, an occurring force can be reduced uniquely by deforming work. According to one advantageous embodiment, the bearing permits a relative movement in all directions, in which case the largest possibility of movement is provided essentially in the longitudinal direction of the vehicle for the possibility of an impact of the human body.

According to another advantageous embodiment, an elastically deformable bearing which absorbs the moving energy of the rollover bar and can then deform back into its starting position when the rollover bar is unloaded is provided. This embodiment is particularly advantageous in order to offer a bearing to the rollover bar which is resilient to a limited extent in the case of a repeated effect of force on the rollover bar.

Advantageously, the bearing comprises an absorber element which is constructed to be deformable and particularly plastically or elastically deformable and which by deformation can partially or completely absorb the movement energy introduced by an impact on to the rollover bar.

The rollover bar can consist of a tube, a rod or a profile construction and can be made of steel or a comparable firm material and extend essentially along the whole vehicle width. Likewise, for example, a U-shaped rollover bar can be provided approximately behind each seat whose two legs, while pointing downward, are accommodated in two receiving tubes fixedly mounted on the vehicle and are disposed therein by means of the absorber elements. In the normal condition, the absorber elements hold the rollover bar or the two legs away from the interior wall of the respective receiving tube and permit the above-described shifting of the rollover bar until the legs come to rest on the receiving tube and/or in the axial direction on a fixed stop.

The bearing may have one or several absorber elements on each leg. The absorber element may have a spring arrangement which holds the leg under spring prestress in the receiving tube and against whose force the rollover bar can be elastically deflected. On the other hand, the absorber element may have a reversibly or irreversibly deformable structure, such as a honeycomb structure, which reduces introduced movement energy by deformation. Advantageously, the absorber element is ring-shaped and is fitted between the leg and the receiving tube, in which case the leg is then received in an approximately central longitudinal bore or molded-in recess. Preferably, the leg is eccentrically accommodated in the receiving tube such that, in a preferred direction, it is provided with a movement path which is as large as possible. For this purpose, in one advantageous embodiment, the longitudinal bore or recess is eccentrically displaced in the ring-shaped absorber element so that, in the installed position of the absorber element, the leg is arranged closer to the forward wall section of the receiving tube (viewed in the driving direction).

In another advantageous embodiment, the absorber element contains an outer ring for the contact against the interior wall of the receiving tube and an inner ring for the firm holding of the leg. The two rings are flexibly connected with one another by means of deforming webs which also determine the deforming capacity of the absorber element.

The absorber element may advantageously be made of an elastomeric material (such as rubber or an elastomeric plastic material with comparable characteristics). It may also be combined with other materials as well as with metal in order to advantageously combine stability and elastic characteristics.

A leg of the rollover bar can be constructed to be lengthened in order to offer to the rollover bar the required rigid bearing when being placed against the receiving tube. Depending on the arrangement of the absorber element with respect to the leg and the movement possibility of the leg in the receiving tube, different displacement and swivelling movements of the rollover bar may be permitted.

Advantageously, an additional securing of the rollover bar against a removal or an unintended pulling-out in the case of a turnover can be provided. This safety device can be constructed as a lock or catch engaging on a recess of the leg.

Other objects, advantages and novel features of the present invention will become apparent from the following detailed description of the invention when considered in conjunction with the accompanying drawings.

DETAILED DESCRIPTION OF THE DRAWINGS

Figure 1:
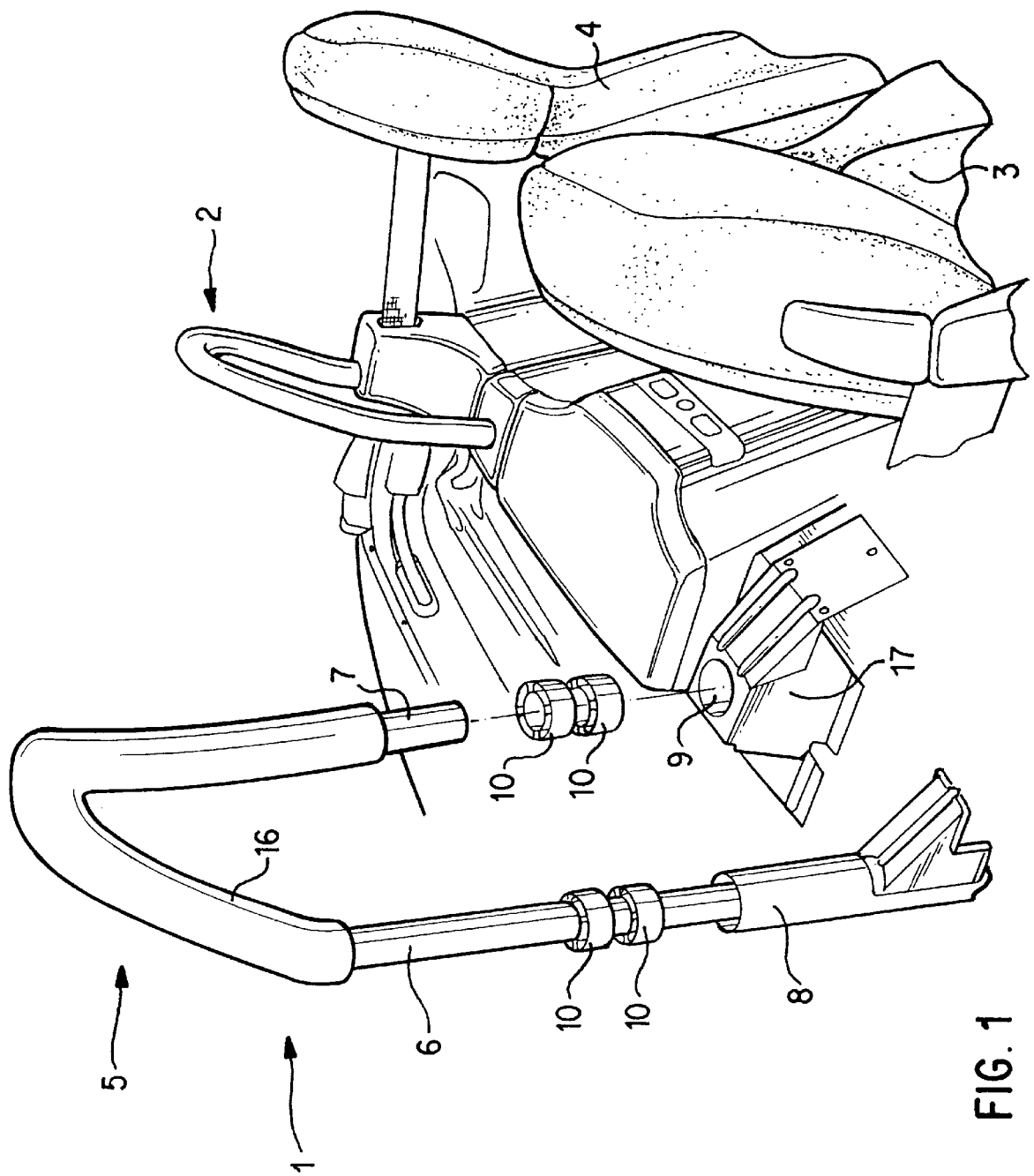
FIG. 1 is a perspective elevated exploded view of a rollover protection device according to one preferred embodiment of the present invention.
Figure 7:
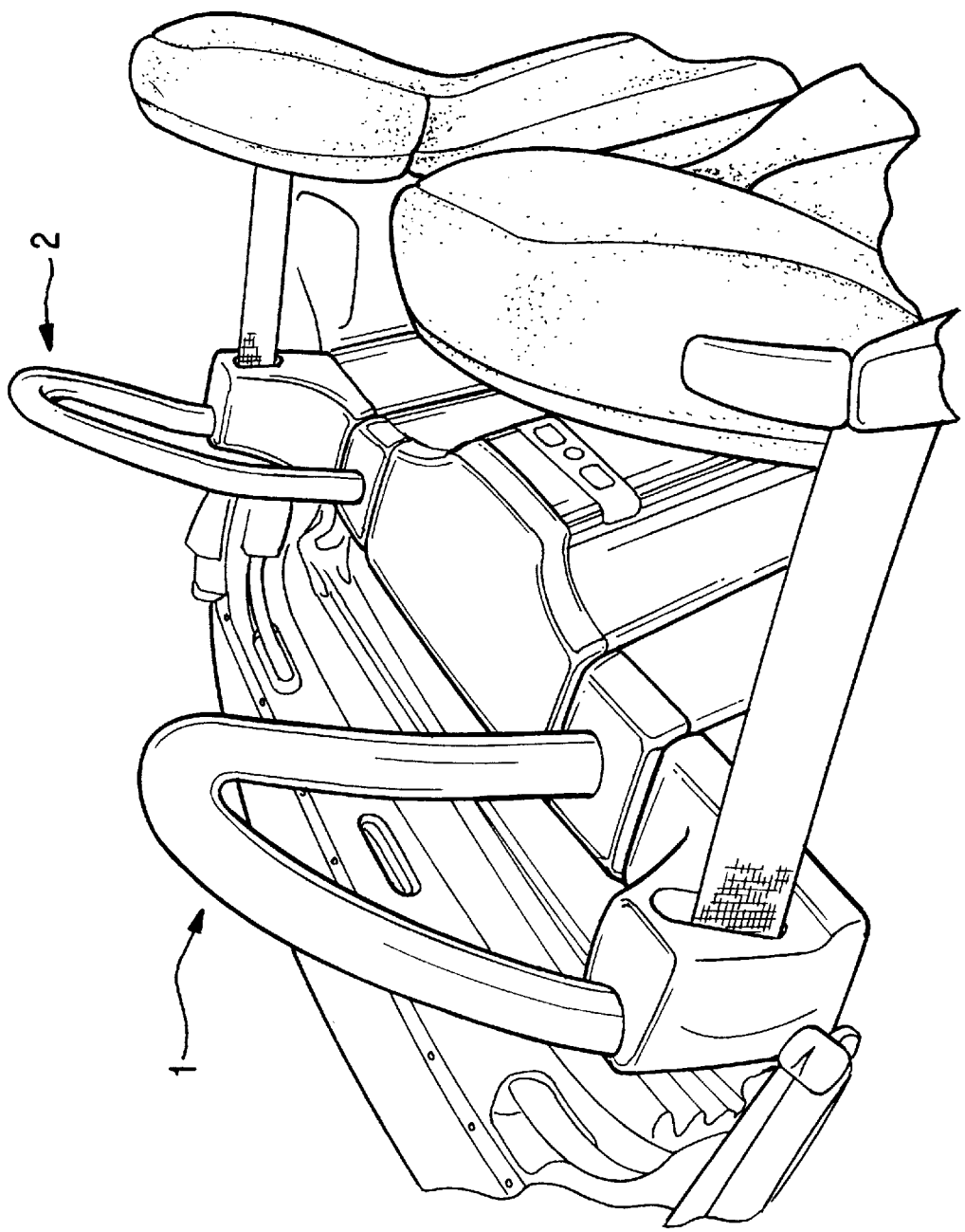
FIG. 7 is a perspective elevated view of the rollover bars according to the present invention installed in a vehicle in the normal condition.

A rollover protection device according to the invention contains two rollover bars 1, 2 which are arranged behind the two seats 3 and 4 of a convertible (see FIGS. 1 and 7). With respect to a longitudinal vehicle axis, the two rollover bars 1, 2 are arranged and constructed approximately mirror-symmetrically so that the following description will describe only one of the rollover bars (specifically the rollover bar 1 which is on the right with respect to the vehicle), but applies to both rollover bars.

The rollover bar 1 (see FIG. 1) contains two spaced legs 6, 7 which, in its installed position, extend from a connection piece 5 in parallel downward, the leg 6 which is on the outside of the vehicle being longer than the leg 7 which is on the inside and extending farther downward. The legs 6, 7 are each accommodated and disposed in a receiving tube 8, 9 corresponding to the respective leg length. The receiving tube 9 which is on the vehicle interior is contained in a bearing block 17 on the vehicle body. The receiving tube 8 which is on the outside of the vehicle projects on the top and on the bottom beyond the adjacent shorter receiving tube 9.

The inside cross-section or inside diameter of the two receiving tubes 8, 9 is larger than the outside cross-section or outside diameter of the respective, for example, tube-shaped or rod-shaped, bending-resistant (for example, made of steel) legs 6, 7. The legs 6, 7 preferably have a round cross-section so that they can be accommodated with a play to the inside wall of the receiving tubes 8, 9 and may be made, for example, of steel.

In a mutually spaced manner, two absorber elements 10 are mounted on each leg 6, 7, by means of which absorber elements 10 the rollover bar 1 is disposed in the receiving tubes 8, 9 spaced away from the walls of the tube.

Figures 2A, 2C:
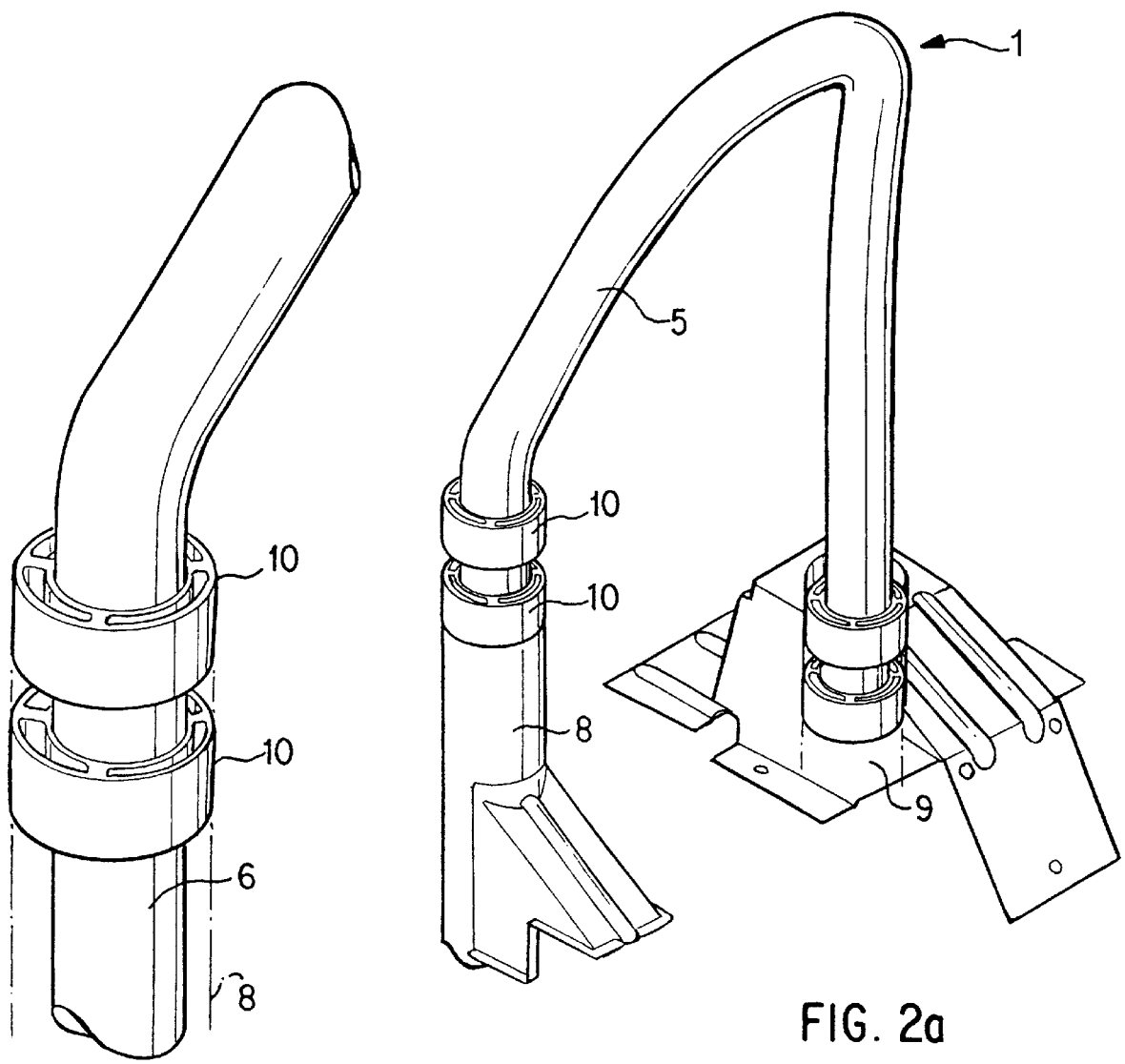
FIGS. 2a–c are perspective elevated views of the rollover device of FIG. 1 with its bearing in the normal condition.
Figure 2B:
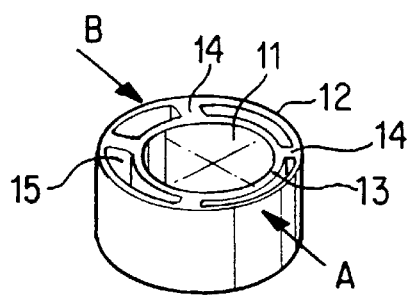

The absorber element 10 is a ring-shaped body with an eccentrically arranged longitudinal bore or passage bore 11. In the embodiment shown in FIGS. 1–3, it has an outer ring 12 and an inner ring 13 which is arranged eccentrically in the outer ring 12 and is connected with the outer ring 12 by means of several webs 14 so that several hollow spaces 15 or longitudinal passages are provided between the outer ring 12 and the inner ring 13. The absorber element 10 is made of an elastomeric material, such as rubber or plastic. The inside diameter of the inner ring 13 is adapted to the outside diameter of the leg 6, 7 such that the absorber element 10 is disposed in a non-displaceable manner on the leg 6, 7. For this purpose, the absorber element 10 can be pushed onto the leg 6, 7 and can be fixed on the leg 6, 7 by means of a screw or an adhesive, and can be pressed on or vulcanized on.

The outside diameter of the absorber element 10 is adapted such to the inside diameter of the receiving tube 8, 9 that the absorber element 10 can be elastically and firmly fitted into the receiving tube 8, 9. Instead of having the shown circular cross-section, the receiving tube 8, 9 and the absorber element 10 may also have an elliptic or any other suitable cross-section.

Each absorber element 10 is arranged to be aligned such that the inner ring 13 or the longitudinal bore 11 is displaced eccentrically toward the front in the longitudinal direction of the vehicle. This means that the wall thickness of the absorber element 10, measured from the interior side of the inner ring 13 to the exterior side of the outer ring 12, in a vertical sectional plane in the longitudinal direction is smaller on the forward side (arrow A in FIG. 2b) than on the opposite rearward side (arrow B).

By means of the elastic suspension of the inner ring 13 on the outer ring 12 by way of the webs 14, in the case of a corresponding introduction of force, the leg 6, 7 can move radially or generally in a horizontal plane in the absorber element 10 relative to the outer ring 12 and thus to the receiving tube 8, 9 until it comes to rest on the wall of the receiving tube 8, 9. According to the eccentric arrangement of the absorber element 10 and of the leg 6, 7 in the absorber element 10, the movement and deformation path is the largest in the longitudinal direction of the vehicle. However, the leg 6, 7 can also move laterally until it comes to rest against the receiving tube 8, 9. The movement possibility is determined by the damping capacity of the material of the webs 14 as the result of their number, size, distribution and deformation characteristics. As a function of the bearing arrangement (length, mutual spacing and arrangement of the absorber elements), a tilting movement of the leg 6, 7 in the absorber element 10 may also take place, that is, a swivelling of the longitudinal axis of the leg 6, 7 and of the inner ring 13 relative to the outer ring 12 (see, for example, FIG. 3).

The absorber element 10 may be a combination bearing which has an outer ring and an inner ring made of a hard and essentially non-deformable material, such as metal or hard plastic, which are connected with one another by elastically deformable webs.

In the case of a vehicle rollover, in which the rollover bar 1, 2 must support the vehicle weight, a significant force component is introduced in the longitudinal direction of the legs 6, 7 (that is vertically) into the rollover bar 1, 2. This rollover bar 1, 2 is displaced axially by a defined distance, for example, by 5 mm, to an axial stop (not shown) on the receiving tube 8, 9 and is rigidly supported thereon. The elastic webs 14 can deform corresponding to this axial movement.

A covering surrounds the two receiving tubes 8, 9 and the bearing block 17 (see FIGS. 1 and 7). The area of the installed rollover bar 1, 2, which is outside the two receiving tubes 8, 9 (that is, essentially the connection part 5, which can be of a U-shape or similar shape, and an upper section of the leg 7) is provided with a cushioning or padding 16 which is constructed as a foamed-material casing.

Figures 3A, 3B, 3C:
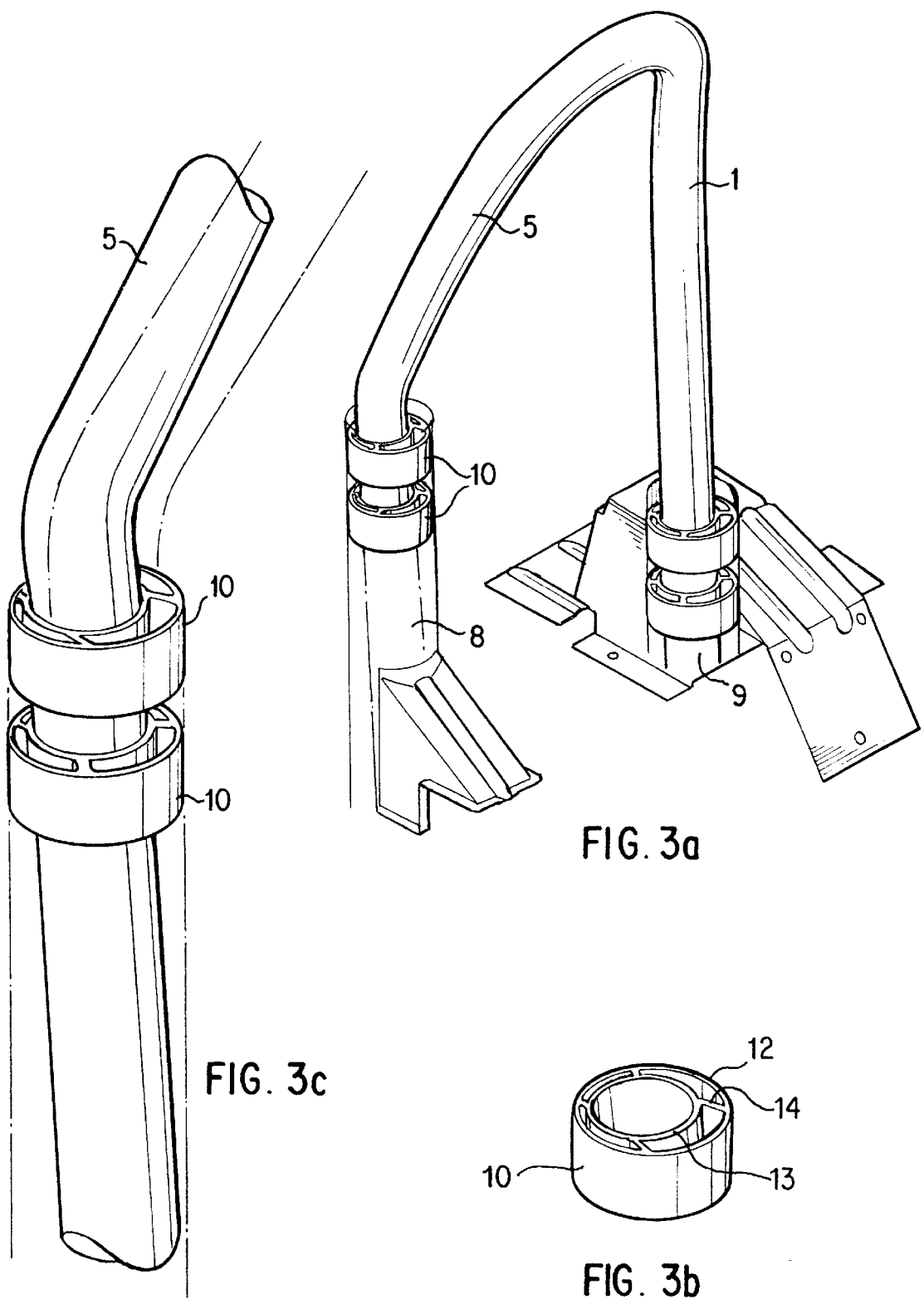
FIGS. 3a–c are perspective elevated views of the rollover device of FIG. 1 with its bearing in a deflected condition.

FIGS. 3a–c show a rollover bar which is deflected to the rear in the longitudinal direction of the vehicle (the undeflected normal condition is illustrated by a broken line). FIG. 3c clearly shows the deformed absorber element 10 (leg not shown) whose inner ring 13, while the webs 14 are deformed, has been displaced toward the rear relative to the outer ring 12.

Figure 4:
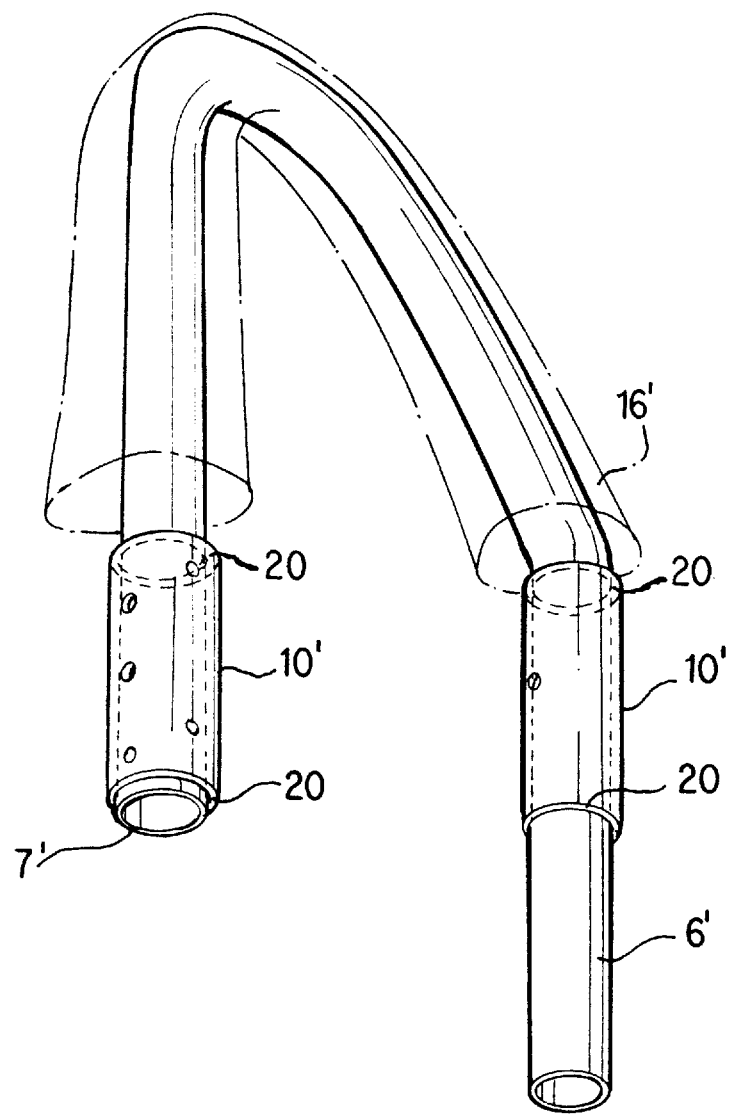
FIG. 4 is a perspective view of a rollover protection device according to another preferred embodiment of the present invention.
Figure 5:
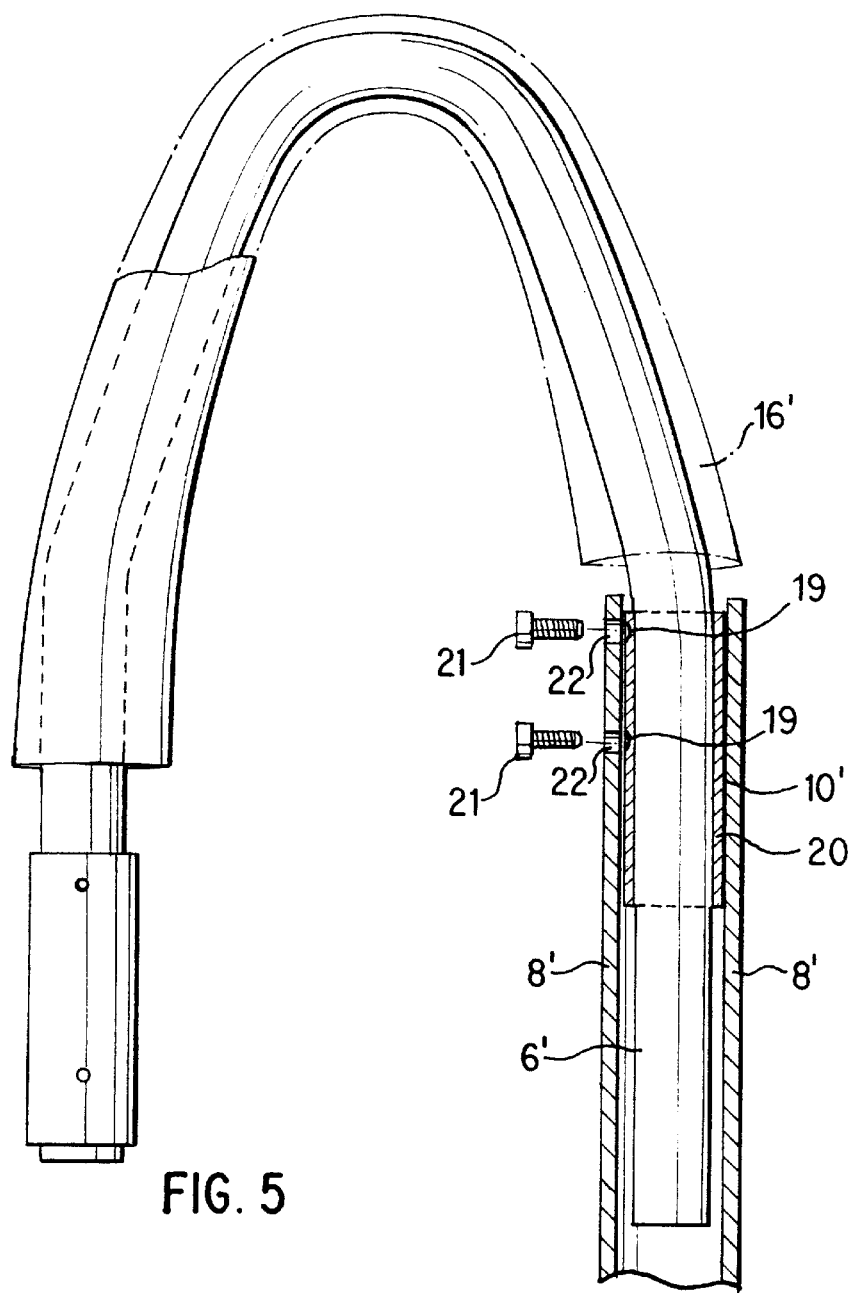
FIG. 5 is a front view of the rollover device of FIG. 4.
Figure 6:
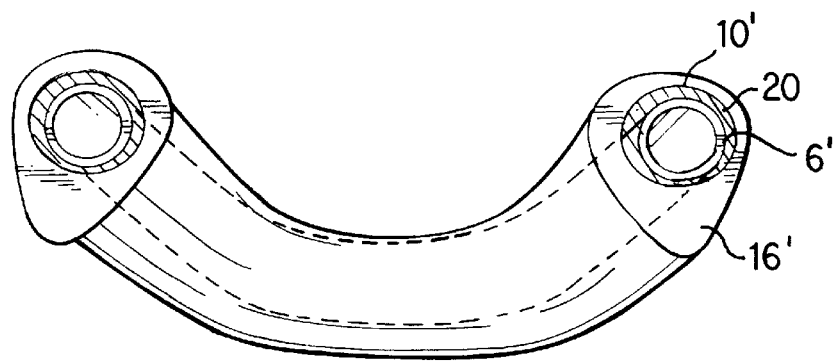
FIG. 6 is a sectional view of the rollover device of FIG. 4.

FIGS. 4–6 show another embodiment of the present invention, in which the absorber element comprises an outer tube 10' with an inner elastic sleeve 20 disposed on an interior side. The tube 10' may be made of plastic, or metal, such as aluminum. The elastic sleeve 20 (shown in hatched lines) is made of an elastic material, preferably a foam rubber. The elastic sleeve 20 and the tube 10', when made of metal, thus form an elastomer-metal combination element. The elastic sleeve 20 preferably extends the full length of the tube 10', but may extend only part of the length of the tube 10'. In an assembled position, the inner elastic sleeve 20 is disposed between the tube 10 and one of the legs 6', 7'. The exposed portion of the rollover bar is covered with a cushioning or padding 16'. The absorber element consisting of the tube 10' and the elastic sleeve 20 may be attached to the leg 6', 7', for example by vulcanization. The legs 6', 7' are received by the receiving tubes 8', and are fastened thereto by threaded connectors 21, such as bolts or screws, which are placed through respective holes 22 of the receiving tubes 8' and threaded into respective threaded receptacles 19 in the tube 10'. The elastic deformability of the elastic sleeve 20 provides the damping effect which permits a limited relative movement of the rollover bar (legs 6', 7') with respect to the vehicle-fixed structure (receiving tubes 8').

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A rollover protection device for a motor vehicle, comprising at least one rollover bar having two legs which are disposed in two vehicle-fixed receiving tubes via at least two deformable absorber elements which permit a limited relative movement of the rollover bar with respect to the vehicle-fixed receiving tubes, the legs being eccentrically positioned in the absorber elements with respect to the receiving tubes.

2. A rollover protection device according to claim 1, wherein the absorber elements are elastically deformable.

3. A rollover protection device according to claim 1, wherein, in an undeformed position, said legs are held by said deformable absorber elements away from walls of said receiving tubes.

4. A rollover protection device according to claim 3, wherein the deformable absorber elements are fastened by screws on the legs or the receiving tubes.

5. A rollover protection device according to claim 3, wherein the deformable absorber elements are vulcanized onto the legs.

6. A rollover protection device according to claim 1, wherein the deformable absorber elements surround the legs in a ring-shaped manner.

7. A rollover protection device according to claim 1, wherein the absorber elements are made of an elastomeric material.

8. A rollover protection device according to claim 1, wherein the absorber elements are elastomer-metal combination elements.

9. A rollover protection device according to claim 1, wherein the maximum moving paths of the legs in the deformable absorber elements are aligned approximately in the longitudinal direction of the vehicle.

10. A rollover protection device according to claim 1, wherein one of said two legs of the rollover bar is lengthened relative to the other of said two legs of the rollover bar.

11. A rollover protection device according to claim 1, wherein the two legs are connected by a free section of the rollover bar which is provided with a cushion.

12. A rollover protection device according to claim 11, wherein the cushion is a foamed material which encases the rollover bar.

13. A rollover protection device according to claim 1, wherein two of said deformable absorber elements are provided on each of said legs.

14. A rollover protection device according to claim 1, wherein said motor vehicle is a convertible with two seats, and wherein said at least one rollover bar comprises two rollover bars which are arranged approximately behind the two seats.

15. A rollover protection device for a motor vehicle, comprising at least one rollover bar which is disposed on a vehicle-fixed structure with a deformable absorber element which permits a limited relative movement of the rollover bar with respect to the vehicle-fixed structure, wherein the absorber element has an outer ring and an inner ring and the two rings are connected with one another by webs.

16. A rollover protection device for a motor vehicle, comprising:
 a rollover bar comprising at least one leg;
 a vehicle-fixed receiving tube configured to receive the rollover bar; and
 an elastically deformable ring-shaped absorber element interposed between the rollover bar and the vehicle-fixed receiving tube to permit a limited relative movement of the rollover bar with respect to the vehicle-fixed receiving tube, the absorber element holding the leg at a radial distance from the receiving tube, the absorber element including an outer ring and an inner ring arranged inside said outer ring, the outer ring being radially spaced apart from the inner ring with a plurality of webs connecting the outer ring and the inner ring.

17. A rollover protection device according to claim 16, wherein said inner ring is arranged eccentrically with respect to said outer ring.

18. A rollover protection device according to claim 16, wherein an outer periphery of said outer ring engages an inner periphery of said receiving tube, and wherein an inner periphery of said inner ring engages an outer periphery of said leg.

19. A rollover protection device according to claim 16, wherein said deformable absorber element comprises a foam rubber sleeve.

* * * * *